(12) United States Patent
Chen et al.

(10) Patent No.: US 6,715,848 B2
(45) Date of Patent: Apr. 6, 2004

(54) HYDRAULIC ANTI-LOCKING BRAKE SYSTEM FOR MOTORCYCLE

(75) Inventors: Po-Hsi Chen, Daya Shiang Taichung (TW); Long-Cherng Hwu, Taichung (TW); Puu-An Juang, Tei-Ping (TW)

(73) Assignee: Aerospace Industrial Development Corporation, Taichung (TW)

( * ) Notice: Subject to any disclaimer, the term of this patent is extended or adjusted under 35 U.S.C. 154(b) by 0 days.

(21) Appl. No.: 10/171,973

(22) Filed: Jun. 17, 2002

(65) Prior Publication Data

US 2003/0230932 A1 Dec. 18, 2003

(51) Int. Cl.[7] ................................................. B60T 8/32
(52) U.S. Cl. ........................................................ 303/137
(58) Field of Search .............................. 303/137, 9.64, 303/168, 186, 189, 113.1, 116.1, 119.1

(56) References Cited

U.S. PATENT DOCUMENTS 4,123,118 A * 10/1978 Sato ........................ 303/115.1
6,089,682 A * 7/2000 Ishikawa et al. ............ 303/163
6,557,949 B2 * 5/2003 Tani et al. .................. 303/9.64

FOREIGN PATENT DOCUMENTS

JP   387 783 A2  * 9/1990
JP   476 580 A2  * 3/1992

* cited by examiner

Primary Examiner—Jack Lavinder
Assistant Examiner—Xuan Lan Nguyen
(74) Attorney, Agent, or Firm—Birch, Stewart, Kolasch & Birch, LLP

(57) ABSTRACT

An hydraulic ABS system for motorcycle is installed between the wheels and the corresponding braking levers. The system respectively includes two hydraulic circuits respectively comprised of a pressure increasing circuit and a pressure releasing circuit, and an electric control unit where a plurality of control zones are established. The front and rear wheel braking levers respectively provide two braking signals that separately or simultaneously control the respective braking forces of the front and rear wheels. Via calculated slip rates, the operation of pressure increasing and releasing circuits are further timely controlled to achieve an optimal braking.

8 Claims, 4 Drawing Sheets

| road surface | asphalt road surface (friction coefficient:0.81) | | | marble road surface (friction coefficient:0.41) | | |
|---|---|---|---|---|---|---|
| braking rate | Zm | Zmax | $\frac{Zmax}{Zm}$ | Zm | Zmax | $\frac{Zmax}{Zm}$ |
| front wheel | 0.76 | 0.63 | 0.83 | 0.35 | 0.28 | 0.8 |
| rear wheel | 0.47 | 0.44 | 0.94 | 0.27 | 0.25 | 0.93 |

(1) Z(braking rate)=0.56/t, wherein t is the time necessary to slow down the vehicle from 40km/h to 20km/h;
(2) Zm is the maximum braking rate without ABS, Zmax is the maximum braking rate with ABS;
(3) Zmax/Zm is the ABS utilization rate of a single controlled wheel.

FIG. 4

HYDRAULIC ANTI-LOCKING BRAKE SYSTEM FOR MOTORCYCLE

FIELD OF THE INVENTION

The invention relates to an anti-locking brake system (ABS) and, more particularly, to an hydraulic anti-locking brake system that uses an hydraulic circuit and an electric control unit to respectively control the braking force of the front and rear wheels.

BACKGROUND OF THE INVENTION

When a motor-driven vehicle is braked, if the brake system is not adequately designed, the control of the braking force may be insufficient and the wheels may be locked, causing dangerous sliding of the vehicle. Therefore, in order to overcome the above problem, anti-locking brake (ABS) systems have been developed.

Anti-locking brake systems generally use a single braking control signal, a pressure motor, a system of single oil circuit, a control unit, and an hydraulic structure of four wheels and eight electromagnetic valves. By comparing the respective velocities of the four wheels of, for example, a car, a vehicle velocity is consequently evaluated. By comparing the vehicle velocity and each wheel velocity, an adequate amount of pressure increase and pressure release is consequently supplied to the system. Hence, when the driver presses on the brake pedal, a braking signal is outputted to activate the ABS system. When a wheel velocity is lower than the vehicle velocity, a sliding effect thus occurs. The oil output vales of the electromagnetic valves are consequently opened so as to reduce the braking pressure. Oppositely, if a wheel velocity is higher than the vehicle velocity, the vehicle thus has an insufficient braking force. The oil input valves of the electromagnetic valves are opened so as to increase the braking force. The above operations are repeated until the brake pedal is released or the vehicle is stopped. Because the above traditional system only has a single braking control signal and a system of a single oil circuit, each wheel therefore has substantially a same braking force. However, because the respective configuration of each wheel is different from one another, the application of a same braking force to each wheel therefore does not provide the optimal braking conditions. Furthermore, because the wheel characteristics are different from one wheel to another wheel, the comparison of the vehicle velocity with the wheel velocity to determine a pressure increase or pressure release therefore needs to be effected with respect to each wheel to provide adequate regulation.

SUMMARY OF THE INVENTION

Accordingly, it is therefore a principal object of the invention to provide an hydraulic anti-locking brake system for a motorcycle that uses two braking control signals, a pressure motor, and an hydraulic structure of two wheels and four electromagnetic valves. Thereby, the respective braking forces of the front wheel and rear wheel can be separately or simultaneously controlled. Thus, optimal braking forces can be obtained.

To attain the above and other objectives, an hydraulic anti-locking brake system for a motorcycle of the invention comprises two hydraulic circuits respectively installed on a front wheel braking lever and a corresponding front wheel brake, and between a rear wheel braking lever and a corresponding rear wheel brake. Each hydraulic circuit comprises a pressure compartment with at least a piston, a pressure increasing circuit, and an electric control unit. The pressure compartment has an oil outlet, and the piston is connected to one of the front or rear wheel braking levers. The pressure increasing circuit includes an inlet terminal and an outlet terminal, the oil outlet of the pressure compartment being connected to the inlet terminal of the pressure increasing circuit. The pressure releasing circuit is connected between the outlet terminal of the pressure increasing circuit at one end, and the oil outlet of the pressure compartment and the inlet terminal of the pressure increasing circuit at another end. The pressure releasing circuit is further connected to a motor. The electric control unit comprises a front wheel velocity sensor, a rear wheel velocity sensor, a slip rate calculator, a slip rate comparator, a front wheel controller and a rear wheel controller. From the velocity values sensed by the front and rear wheel sensors, the slip rate calculator determines the velocity of the motorcycle and slip rates of the front and rear wheels. From a plurality of control zones of slip rate parameters established in the electric control unit, the slip rate comparator determines in which control zone the calculated slip rates of the front and rear wheels are located. Respective signals are consequently outputted to the front and rear wheel controllers that consequently control the operations of the motor, pressure increasing circuit, and pressure releasing circuit. Via the operation of the braking levers, an actuation of the piston is thereby activated to provide hydraulic pressure. According to a variation of the calculated slip rates of the front and rear wheels, different signals hence are further outputted to control the pressure increasing circuit and the pressure releasing circuit so as to adequately regulate the braking hydraulic pressure.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings, which are given by way of illustration only, and thus are not limitative of the present invention, is as follows:

FIG. 4 is a table depicting testing results obtained with an hydraulic ABS brake system of the invention on different types of road surfaces.

DETAILED DESCRIPTION OF THE EMBODIMENTS

Figure 1:
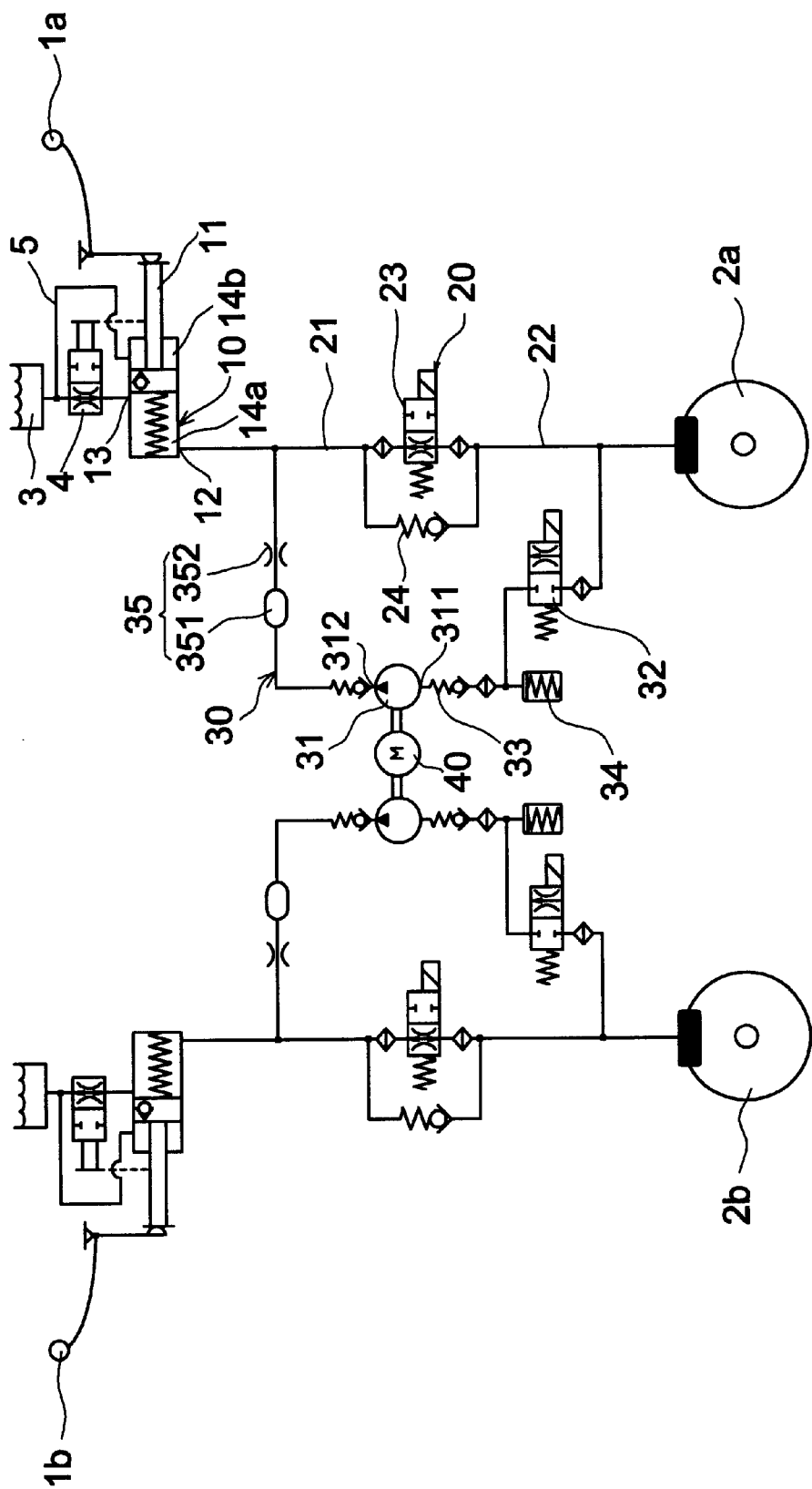
FIG. 1 is a schematic view of the hydraulic circuit of an hydraulic ABS brake system according to an embodiment of the invention.

Wherever possible in the following description, like reference numerals will refer to like elements and parts unless otherwise illustrated.

Figure 2:
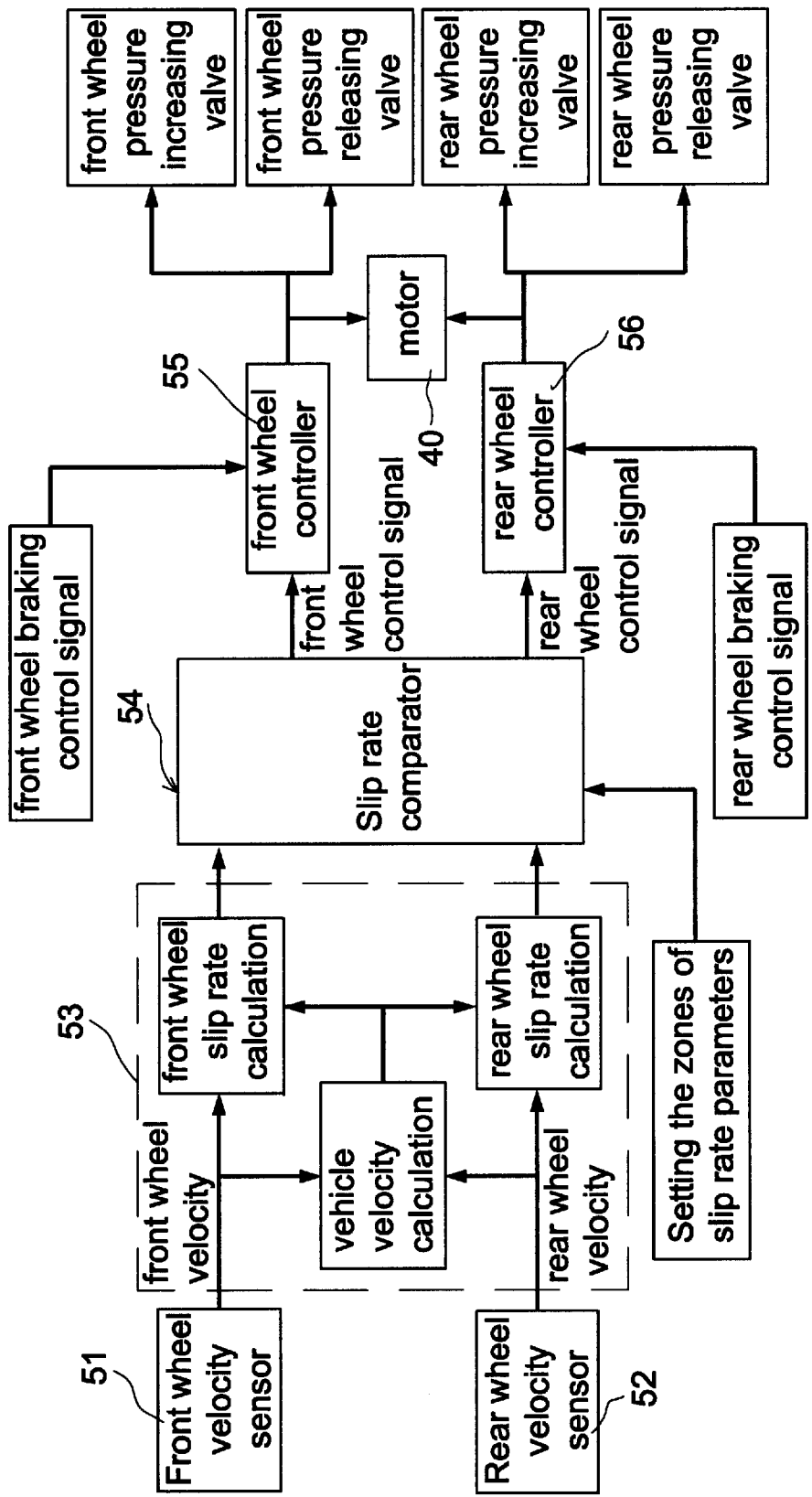
FIG. 2 is a block diagram of an electric control unit incorporated into an hydraulic ABS brake system according to an embodiment of the invention.

FIG. 1 and FIG. 2 are schematic views of an hydraulic anti-locking brake (ABS) system for motorcycle according to an embodiment of the invention. As illustrated, an hydraulic anti-locking brake system of the invention comprises two hydraulic circuits and an electric control unit. The two hydraulic circuits are respectively mounted between a front wheel braking lever 1a and a front wheel brake 2a, and between a rear wheel braking lever 1b and a rear wheel brake 2b. The two hydraulic circuits as described above respectively form brake oil circuits of the front and rear wheels. Each hydraulic circuit comprises a pressure compartments 10 with at least a piston 11. The piston 11 is connected to one braking lever (i.e. front wheel braking lever 1a or rear wheel braking lever 1b). The pressure compartment 10 has an oil outlet 12 that is connected to an inlet terminal 21 of a pressure increasing circuit 20 further having an outlet terminal 22. A pressure releasing circuit 30 is connected between the outlet terminal 22 of the pressure increasing circuit 20 at one end, and the oil outlet 12 of the pressure compartment 10 and the inlet terminal 21 of the pressure increasing circuit 20 at another end. The pressure releasing circuit 30 is further connected to a motor 40, common to each hydraulic circuit.

As illustrated in FIG. 1, the connection of the pressure increasing circuit 20 with the pressure compartment 10 forms a principal oil circuit that supplies one brake organ with the necessary brake oil. The pressure increasing circuit 20 includes a pressure increasing valve 23 and a one-way valve 24. The pressure increasing valve 23 is typically an electromagnetic valve with an initial open state. Hence, when no electric command is applied thereon, the pressure increasing valve 23 is open and the input and output thereof communicate with each other. Hydraulic pressure oil hence is delivered from the pressure compartment 10 to the brake (i.e. the front wheel brake 2a or the rear wheel 2b). If an electric command is applied thereon, the pressure increasing valve 23 is sealed and the input and output thereof do not communicate with each other. Once the electric command is removed, a spring exerts a resilient force that urges the pressure increasing valve 23 to recover its initial open state. The one-way valve 24 ensures the hydraulic pressure oil flowing between the brake and the outlet terminal 22 is achieved only in one direction to the pressure compartment 10.

The pressure releasing circuit 30 is used to redirected the hydraulic pressure oil that leaks during pressure releasing from the brake organ to the principle circuit. The pressure releasing circuit 30 comprises a pump 31 and a pressure releasing valve 32. The pressure releasing 32 valve is an electromagnetic valve initially in a sealing state. When no current no electric command is applied thereon, the pressure releasing valve 32 is sealed and the input and output thereof do not communicate with each other. When an electric command is applied thereon, the pressure releasing valve 32 is open. Once the electric command is removed, a spring exerts a resilient force that has the pressure releasing valve 32 recover its initial state. The pump 31 is driven via the motor 40 to pump oil. Two terminals of the pump 31 are connected to one-way valves 33 to control the flowing direction of the hydraulic pressure oil. At an oil inlet 311 of the pump 31, an oil storage device 34 is connected to provide hydraulic pressure oil needed by the pump 31 in starting pumping. The pump 31 is thereby prevented from pumping vacuum when it starts to pump. At an oil outlet 312 of the pump 31 is further connected to a shake reducer 35, comprised of a gas-bag type pressure retainer 351 and a throttle flap 352. The shake reducer 35 hence enables a reduction in the kick-back effects produced at the braking levers due to the pulsed pressure wave motion of oil drainage.

With reference to FIG. 2, the electric control unit comprises a front wheel velocity sensor 51, a rear wheel velocity sensor 52, a slip rate calculator 53, a slip rate comparator 54, a front wheel controller 55 and a rear wheel controller 56. The front wheel velocity sensor 51 and the rear wheel velocity sensor 52 are respectively installed on the front and rear wheels to sense the velocities of the front and rear wheels. From the velocity values sensed by the sensors 51 and 52, the slip rate calculator 53 determines the velocity of the motorcycle and the slip rates of the front and rears wheels. Because the velocity of the motorcycle is not easily determined, the invention further provides a calculation method to evaluate the motorcycle velocity. This method is achieved by taking the highest velocity of the front or rear wheel as a first vehicle reference velocity. Once a braking signal is confirmed, the first vehicle reference velocity is used as an initial velocity, and a braking time interval is set. By differential calculus applied to the initial velocity, a vehicle deceleration is calculated from dividing the initial velocity by the braking time interval. The maximum of the first reference velocity and the vehicle velocity subjected to the deceleration is chosen as the actual vehicle velocity. For example, once the braking signal is confirmed, a maximum velocity sensed from the front or rear wheel is 40 km/hour (i.e. 4000 m/3600 sec=11.1 m/sec). This first vehicle reference velocity is taken as an initial velocity. By taking the braking time interval as, for example, two seconds without wheel sliding, the deceleration 5.5 $M/s^2$ hence is obtained (11.1 m/s÷2=5.5 $m/s^2$). By continuously measuring the velocities of the front and rear wheels at each instant within the braking time interval to determine the first reference velocity, and by comparing this velocity to one subjected to the declaration as described above, the maximum velocity is taken as the actual velocity. Furthermore, the calculation of the slip rate is as follows:

Slip rate=[(vehicle velocity−wheel velocity)/vehicle velocity]× 100%

From the above, the slip rate is the percentage of the difference between the vehicle velocity and the wheel velocity divided by the vehicle velocity. The slip rates of the front and rear wheel are therefore calculated as follows:

Slip rate of the front wheel=[(vehicle velocity−front wheel velocity)/vehicle velocity]×100%; and Slip rate of the rear wheel=[(vehicle velocity=rear wheel velocity)/ vehicle velocity]×100%.

From the slip rates obtained according to the above manner, the slip rate comparator 51 sets a plurality of control zones and determines the control zones where the slip rates of the front and rear wheels are located. The slip rate comparator 51 hence outputs a signal to the front and rear wheels controllers 55, 56 that control the operations of the motor 40, the pressure increasing valve 23 of the pressure increasing circuit 40, the pressure increasing valve 23 of the pressure increasing circuit 20, and the pressure releasing valve 32 of the pressure releasing circuit 40, respectively.

From the above construction, the hydraulic anti-locking brake system for a motorcycle of the invention is achieved. An actuatation of the braking levers (i.e. front wheel braking lever 1a and/or rear wheel braking lever 1b) operates the move of the piston 11 to provide an hydraulic pressure. According to the variation of the slip rates, different signals are outputted to control the pressure increasing circuit 20 and the pressure releasing circuit 30. The hydraulic pressure is thereby regulated in a manner that the hydraulic pressure oil circuit provides the required braking force to the front and rear wheel brake organs 2a, 2b.

The operation of the system of the invention will now be described in detail. The oil inlet 13 of the pressure compartment 10 is connected to an oil tank 3 via a switching valve 4 used to change the oil path. When the braking levers (1a and/or 1b) are not pressed, the hydraulic pressure oil is conducted from the oil tank 3 via the switching valve 4 into an oil chamber 14a of the pressure compartment 10 to provide the necessary amount of oil for motorcycle running. When the braking levers (1a and/or 1b) are pressed, the hydraulic pressure is provided simultaneous to the actuation of the piston 11. The switching valve 4 is thereby in a sealing state and the oil from the oil tank 3 travels through another oil circuit 5 to enter another oil chamber 14b of the pressure compartment 10. Via the actuation of the piston 11, the hydraulic pressure oil within the oil chamber 14 is outputted through the pressure increasing valve 23 to the brake organs (front wheel brake organ 2a and/or rear wheel brake organ 2b) to brake the motorcycle. However, as the pressures on the braking levers increase, the hydraulic pressure would become excessive. The braking pressures exerted on the brakes would become excessive and the vehicle wheels will lock. Therefore, by providing the hydraulic circuit with an electric control unit, the hydraulic pressure can be adequately regulated from the calculated slip rates to provide an optimal braking force. During the operation of the motorcycle, the electric control unit continuously evaluates the respective velocities and slip rates of the front and rear wheels, and determines the adequate braking force from the information of slip rates. The electric control unit accordingly drives the pressure increasing circuit 20 and/or the pressure releasing circuit 30 to effectively achieve an optimal braking force. Once the electric control unit has received a braking signal from the brake levers, the electric control unit activates the motor 40 of the hydraulic circuit. When the pressure is excessive and may cause the vehicle wheels to be locked, the electric control unit respectively commands the pressure increasing valve 23 to close and the pressure releasing valve 32 to open. The braking oil in the oil circuit thereby flows to the oil retainer 34 to reduce the pressure and consequently the braking torque. At the same time, the motor 40 is turned on to redirect the braking oil toward the principal oil circuit. When the pressure release is excessive, the pressure increasing valve 23 is opened and the pressure releasing valve 32 is closed so as to increase the braking pressure. By successively repeating the above operations of the pressure increasing valve 23 and pressure releasing valve 32, an adequate braking force hence can be continuously sustained until the motorcycle is completely stopped.

As described above, the invention uses two hydraulic systems to respectively control the respective braking forces of the front and rear wheels from braking signals delivered from two braking levers. The operations of the respective pressure increasing valve and pressure releasing valve of each hydraulic circuit are depended on the operations of their respective braking lever and front/rear wheel controller. According to the respective slip rate of the front/rear wheel, the hydraulic pressure can be therefore adequately regulated to achieve optimal braking forces of the front and rear wheels.

Figure 3:
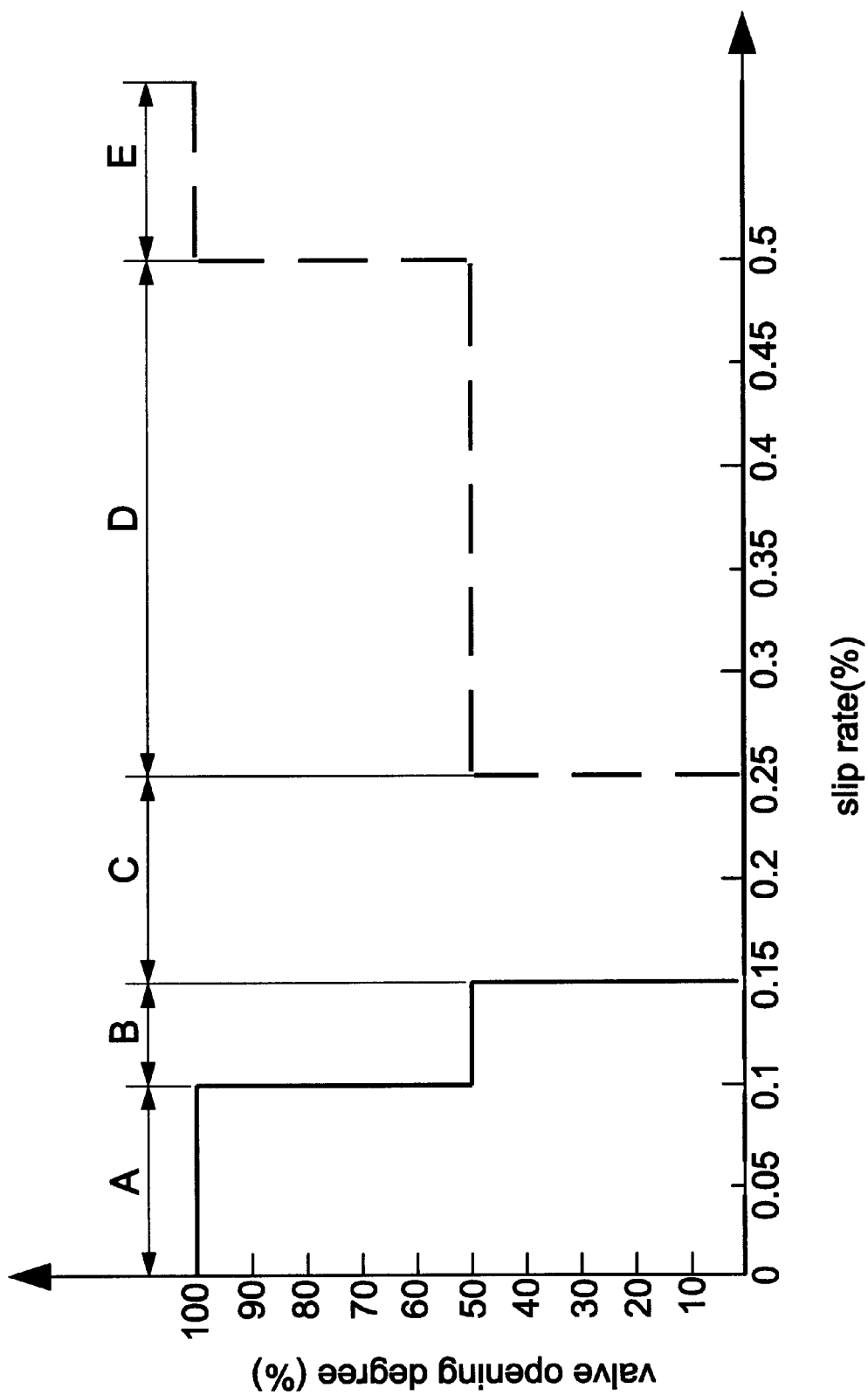
FIG. 3 is a graph plotting the relationship between a slip rate and an opening degree of electromagnetic valves incorporated in an hydraulic ABS brake system according to an embodiment of the invention.

Referring to FIG. 3, a graph schematically plots a set of slip rate parameters achieved with the system of the invention. In the graph of FIG. 3, the continuous curve depicts the relationship between an opening degree of the pressure increasing valve and the slip rate. Meanwhile, the dotted curve depicts the relationship between the opening degree of the pressure releasing valve and the slip rate. The set of slip rate parameters are obtained by decomposing several control zones into a first control zone (A), a second control zone (B), a third control zone (C), a fourth control zone (D), and a fifth control zone (E). The first control zone (A) corresponds to a slip rate lower than about 0.1%. The second control zone (B) corresponds to a slip rate between about 0.1% and ao 0.15%. The third control zone (C) corresponds to a slip rate between about 0.15% and 0.25%. The fourth control zone (D) corresponds to a slip rate between about 0.25% and 0.5%. The fifth control zone (E) corresponds to a slip rate higher than about 0.5% and is optimal. Hence, when the slip rate calculated from the slip rate calculator is in the first control zone (A), the pressure increasing and releasing circuits are controlled in a manner to respectively have the pressure increasing valve completely opened and the pressure releasing valve sealed. If the slip rate is in the second control zone (B), the opening degree of the pressure increasing valve is set to 50% while the pressure releasing valve is sealed. If the slip rate is in the third control zone (C), the pressure increasing valve and the pressure releasing valve are both sealed. If the slip rate is in the fourth control zone (D), the pressure increasing valve is sealed and the opening degree of the pressure releasing valve is set to 50%. If the slip rate is in the fifth control zone (E), the pressure increasing valve is sealed while the pressure is releasing valve is completely opened.

Hereafter are now described the testing results achieved with the system of the invention and the above slip rate parameters during braking of a motorcycle. The result obtained is a braking rate (Z) that is defined as 0.56/t, wherein t is the time needed to slow down the motorcycle from 40 km/h to 20 km/h. Furthermore, the test has been exemplary achieved with a 150 CC motorcycle on road surfaces of different friction coefficient, such as an asphalt road surface (friction coefficient=0.81) and a marble road surface (friction coefficient=0.41). The results are as follows.

(1) On an asphalt road surface, the braking rate obtained for the front and rear wheels are:

Front wheel: $Z_m=0.76$; $Z_{max}=0.63$; $Z_{max}/Z_m=0.83$;

Rear wheel: $Z_m=0.47$; $Z_{max}=044$ $Z_{max}/Z_m=0.94$;

(2) On a marble road surface, the braking rate obtained for the front and rear wheels are:

Front wheel: $Z_m=0.35$; $Z_{max}=0.28$; $Z_{max}/Z_m=0.8$;

Rear wheel: $Z_m=0.27$; $Z_{max}=0.25$ $Z_{max}/Z_m=0.93$;

wherein $Z_m$ is the maximum braking rate without ABS, $Z_{max}$ is the maximum braking rate with ABS, and $Z_{max}/Z_m$ is the ABS utilization rate of a singly controlled wheel.

According to the current standards of brake systems regarding two-wheels vehicles, for example, 93/14/EEC of the European Economic Community, the ABS systems that comply with the standard must have $Z_{max}/Z_m \geq 0.7$ to provide a sufficient braking force. As shown in FIG. 4 where $Z_{max}/Z_m$ is higher than 0.7, the hydraulic ABS system of the invention therefore provides the front and rear wheels with sufficient braking forces in the meaning of the above standard.

As described above, the hydraulic ABS system of the invention therefore uses slip rates as evaluation parameters to control the operations of the pressure increasing and releasing circuits. The braking forces can be thereby adequately controlled in accordance with the wheel velocities and vehicle velocity. Therefore, via an adequate setting of the slip rate parameters, the hydraulic ABS system of the invention can be also advantageously implemented in other types of motorcycles which are different from that of 150 CC or in other transportation apparatuses necessitating an ABS system.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. An hydraulic anti blocking anti-locking brake system for a motorcycle including a front wheel braking lever, a corresponding front wheel brake a rear wheel braking lever, and a corresponding rear wheel brake the system comprising:

two hydraulic circuits, each hydraulic circuit being respectively installed between the front wheel lever and the front wheel brake and between the rear wheel lever and the rear wheel brake each hydraulic circuit comprising a pressure compartment with at least a piston, the piston being connected to one of the front or rear wheel braking levers, the pressure compartment having an oil outlet;

a pressure increasing circuit, including an inlet terminal and an outlet terminal, the oil outlet of the pressure is compartment being connected to the inlet terminal of the pressure increasing circuit;

a pressure releasing circuit, connected between the outlet terminal of the pressure increasing circuit at one end, and the oil outlet of the pressure compartment and the inlet terminal of the pressure increasing circuit at another end, the pressure releasing circuit being further connected to a motor; and an electric control unit, comprising a front wheel velocity sensor, a rear wheel velocity sensor, a slip rate calculator, a slip rate comparator, a front wheel controller and a rear wheel controller;

wherein from the velocity values sensed by the front and rear wheel sensors, the slip rate calculator determines the velocity of the motorcycle and slip rates of the front and rears wheels; from a plurality of control zones of slip rate parameters established in the electric control unit, the slip rate comparator determines in which control zone the calculated slip rates of the front and rear wheels are located so as to output respective signals to the front and rear wheel controllers that consequently control operations of the motor, pressure increasing circuit, and pressure releasing circuit; via operation of the braking levers, an actuation of the piston is thereby activated to provide hydraulic pressure, and according to a variation of the calculated slip rates of the front and rear wheels, different signals are outputted to control the pressure increasing circuit and the pressure releasing circuit so as to adequately regulate the braking hydraulic pressure; the control zones include a first control zone, a second control zone, a third control zone, a fourth control zone, and a fifth control zone; the first control zone corresponding to a slip rate lower than about 0.1%, the second control zone corresponding to a slip rate between about 0.1% and 0.15%, the third control zone corresponding to a slip rate between about 0.15% and 0.25%, the fourth control zone corresponding to a slip rate between about 0.25% and 0.5%, and the fifth control zone corresponding to a slip rate higher than about 0.5% and being optimal.

2. The system of claim 1, wherein the pressure increasing circuit includes a pressure increasing valve and a one-way valve.

3. The system of claim 2, wherein the pressure increasing valve is an electromagnetic valve having an initial open state.

4. The system of claim 1, wherein the pressure releasing circuit includes a pump and a pressure releasing valve.

5. The system of claim 4, wherein the pressure releasing valve is an electromagnetic valve which is initially closed.

6. The system of claim 1, wherein a slip rate is the percentage of the difference between a vehicle velocity and a wheel velocity divided by the vehicle velocity.

7. The system of claim 1, wherein the motor is connected to the pump of the pressure releasing circuit.

8. The system of claim 1, wherein if the slip rate calculated from the slip rate calculator is in the first control zone, the pressure increasing and releasing circuits are controlled in a manner to respectively have the pressure increasing valve completely opened and the pressure releasing valve sealed; if the slip rate is in the second control zone, the opening degree of the pressure increasing valve is set to 50% while the pressure releasing valve is sealed; if the slip rate is in the third control zone, the pressure increasing valve and the pressure releasing valve are both sealed; if the slip rate is in the fourth control zone, the pressure increasing valve is sealed and the opening degree of the pressure releasing valve is set to 50%; and if the slip rate is in the fifth control zone, the pressure increasing valve is sealed while the pressure releasing valve is completely opened.

* * * * *